United States Patent [19]
Ikeda

[11] Patent Number: 5,808,757
[45] Date of Patent: Sep. 15, 1998

[54] FILM IMAGE SCANNING DEVICE FOR DETERMINING ORIGINAL DOCUMENT POSITION

[75] Inventor: Osamu Ikeda, Kanagawa-ken, Japan

[73] Assignee: Nikon Corporation, Tokyo, Japan

[21] Appl. No.: 561,254

[22] Filed: Nov. 21, 1995

[30] Foreign Application Priority Data

| Feb. 22, 1995 | [JP] | Japan | 7-033737 |
| Feb. 22, 1995 | [JP] | Japan | 7-033738 |
| Feb. 22, 1995 | [JP] | Japan | 7-033739 |
| Feb. 22, 1995 | [JP] | Japan | 7-033740 |
| Feb. 22, 1995 | [JP] | Japan | 7-033741 |
| Feb. 24, 1995 | [JP] | Japan | 7-036420 |

[51] Int. Cl.$^6$ .................................. H04N 1/04
[52] U.S. Cl. ................ 358/498; 358/487; 353/103; 353/108
[58] Field of Search .................... 358/487, 492, 358/496, 497, 498, 506; 353/103, 108, 116, 120

[56] References Cited

U.S. PATENT DOCUMENTS 5,301,043  4/1994  Ichikawa ................ 358/498
5,371,614  12/1994  Ito ........................... 358/487

*Primary Examiner*—Thomas D. Lee
*Attorney, Agent, or Firm*—Oliff & Berridge, PLC

[57] ABSTRACT

An image scanning device is provided with simplified operation. A document holder has reference marks and/or a positioning frame so a document, such as a film or film slide, can be repeatably placed in an accurate position on the document holder. The document can be pressed between two flat plates of transparent material on the document holder to keep the document flat. The image scanning device has a door that need not be manually opened or closed. The document holder is inserted into the image scanning device through the door and is accurately mounted to a movable stage. The stage contacts the document holder so the document holder is positioned on the stage in the same position every time the document holder is mounted to the stage. The stage can also be positioned such that the stage is fixed to a case containing the image scanning device. By fixing the stage to the case, damage to the stage and other support devices is avoided during shipping or transport.

44 Claims, 17 Drawing Sheets

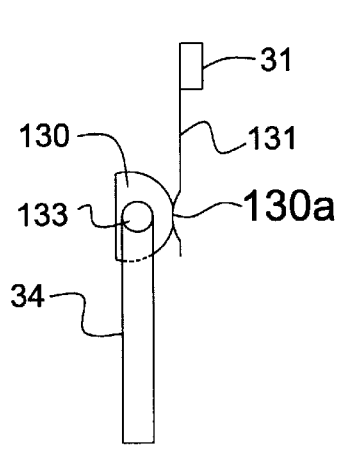
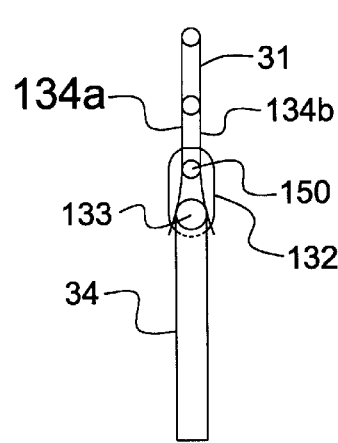
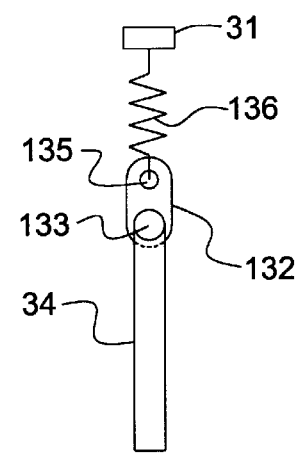
FIG. 9(a)   FIG. 9(b)   FIG. 9(c)
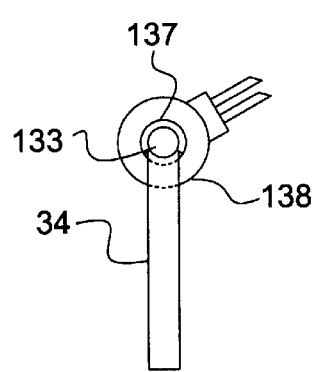
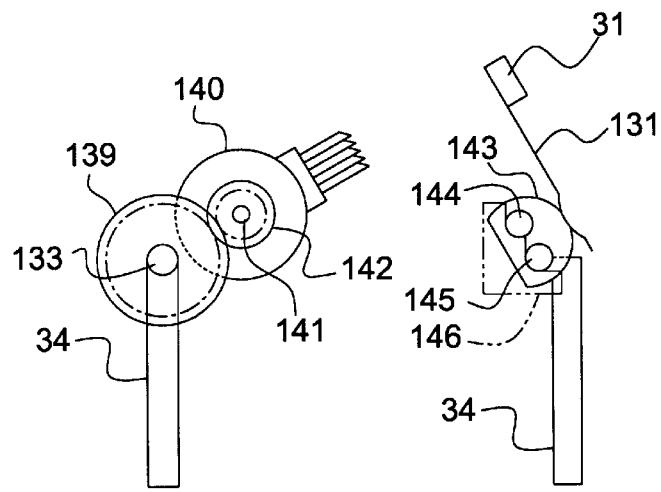
FIG. 9(d)   FIG. 9(e)   FIG. 9(f)

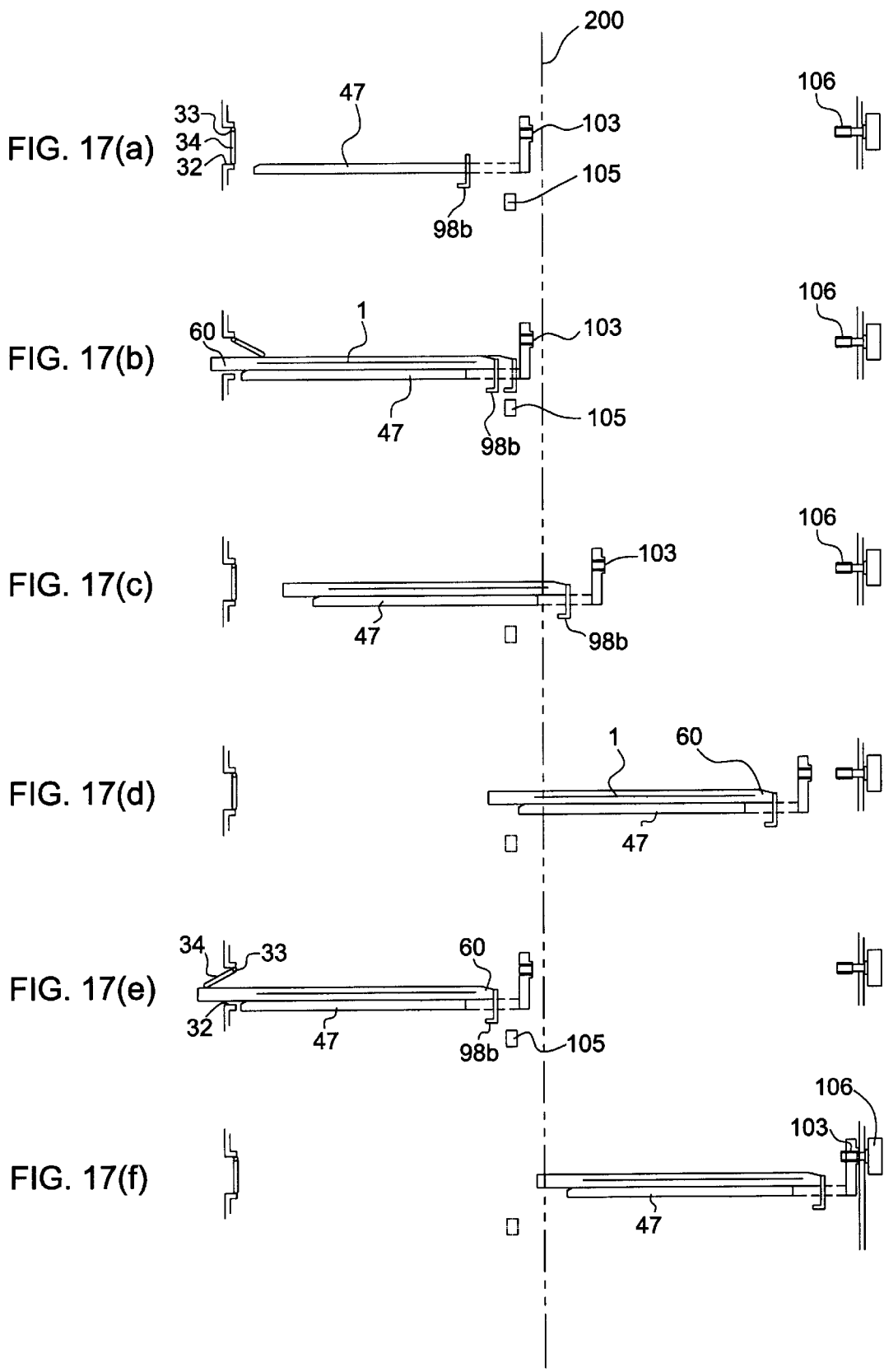

FILM IMAGE SCANNING DEVICE FOR DETERMINING ORIGINAL DOCUMENT POSITION

BACKGROUND OF THE INVENTION

1. Field of the Invention

This invention relates to an image input device which reads images on reflective original documents and in semitransparent film. In particular, this invention relates to a device which enables accurate and predictable original placement of an image to be scanned.

2. Description of Related Art

Devices for scanning an image on a semitransparent film, such as a 35 mm film slide, or other reflective surface are used to convert the image into an electronic signal. Once the image is converted into an electronic signal, an image processor such as a host computer for example, can display, print, store or otherwise process the image.

FIG. 1 shows a conventional image scanning device 300 for converting an image on a film slide to an electronic signal representing the image. The image scanning device 300 is contained within a case 24 and has a power supply 25 and an exhaust fan 27. A film slide 2 is formed of film 1 mounted to a frame 3. The film slide 2 is secured to a holder 5 by a plate spring (not shown). The holder is fixed to a stage 4. A user can close a cover 30 after placing the film slide 2 on the holder 5 to prevent ambient light from illuminating the film 1 during scanning.

The film 1 is illuminated by light 51 emitted from a light source 11, e.g. a halogen lamp. Heat generated by the light source 11 and the power supply 25 is dissipated by the exhaust fan 27 which draws air through an air intake 26. The light 51 passes through a heat absorbing filter 12, a diffusion plate 13, a color filter unit 14 and a condenser lens unit 15 before reaching the film 1. Different color filters in the color filter unit 14 are used to illuminate the film 1 during scanning to generate an electronic signal which is a color representation of the image on the film 1.

Light passing through the film 1 is reflected by a mirror 16 and passes through a lens 17 before reaching a linear charge-coupled device sensor array (CCD) 18. The CCD 18 photoelectrically converts the light 51 into an electronic image signal representing the image on the film 1. The image signal is output to the image processor (not shown).

The lens 17 and the CCD 18 are both fixed to a support member 21. A focus motor 23 drives a lead screw 22, thereby moving the lens 17, the CCD 18 and the support member 21. By moving the lens 17 and the CCD 18, the light 51 is properly focussed on the CCD 18.

Since the light 51 only illuminates a small portion of the film 1 and the CCD 18 is a linear array, the film 1 is moved relative to the light 51 so all portions of the film 1 are scanned. The film 1 is moved by moving the stage 4 in a: direction perpendicular to the direction of propagation of the light 51. The stage 4 is moved by a stage motor 7 that turns a lead screw 6. The lead screw 6 engages with a threaded hole in the stage 4. A guide element 9 fixed to the stage 4 slides along a guide bar 8 and ensures correct positioning of the stage 4.

FIG. 2 shows the case 24 containing the image scanning device 300. A first portion 24a of the case 24 is configured to allow mounting film slides 2 on the stage 4 and movement of the stage 4. The first portion 24a is closed by manually sliding the cover 30 over the first portion 24a when film slides 2 are scanned. Closing the first portion 24a prevents ambient light from interfering with scanning a film slide 2. FIG. 1 shows the cover 30 in the closed position and FIG. 2 shows the cover in the open position.

A second portion 24b of the case 24 contains the light source 11, the heat absorbing filter 12, the diffusion plate 13, the color filter unit 14, the condenser lens unit 15, and the power source 25. A third portion 24c of the case 24 contains the mirror 16, the lens 17, the CCD 18 and the drive components for the stage 4 and the CCD 18 described above.

The image processor controls the operation of the image scanning device 300 when a film 1 is scanned. For example, during scanning the image processor coordinates the focussing of the light 51 on the CCD 18, moving the stage 4 and the film 1, inputting the image signal from the CCD 18, calculating image contrast, adjusting the light 51 intensity and the CCD 18 accumulation time, and calculating and storing a scanning range setting. Properly adjusting the range setting ensures the entire film 1 can be illuminated and scanned.

To scan an image on a film 1 mounted to the holder 5, the image processor controls the image scanning device 300 to position the film 1 at a first position and illuminates a portion of the film 1. Each element within the CCD 18 generates an electronic signal in response to the amount of light which passes through the film 1 and strikes the element. The image processor then detects and stores the signals generated by each element in the CCD 18 in a manner well known in the art.

When the signals from all elements in the CCD 18 are detected, the image processor controls the image scanning device 300 to move the film 1 to a second position and illuminates a next portion of the film 1. The signals from the CCD 18 are again detected and stored. The image processor repeats this process until the entire film 1 is scanned.

In a conventional image scanning device 300, a user must manually open and close the cover 30 to place film slides 2 on the holder 5 or to remove film slides 2. When scanning the film 1, the cover 30 must be closed or scanning can be interfered with by ambient light. Ambient light prevents proper determination of contrast in the image on the film 1, making it impossible to obtain good image data.

Once the film slide 2 is mounted in the conventional image scanning device 300 and the cover 30 is closed, a user must command the image processor to move the stage 4 to a position where the CCD 18 can receive light 51 passing through the film 1. Any misalignment of the film 1 must be corrected by manually adjusting the film slide 2 on the holder 5 or by resetting the reading range on the image processor. Further, once a film slide 2 is removed from the holder 5, it is difficult to reproduce the film slide's 2 original position on the holder 5.

In addition, with the conventional image scanning device 300, it is possible to mount the film slide 2 to the holder 5 so the film slide 2 is not completely placed in the holder 5. In this case, scanning the entire film 1 is impossible. A user must make proper adjustment to the film slide 2 mounting to enable full scanning of the film 1.

Although the conventional image scanning device 300 is generally suitable for scanning a 35 mm-size film slide 2, the image scanning device 300 does not properly read documents of relatively large size, such as Brownie-size or 4×5 size films 1. The reason is the flatness of the larger films 1 is not maintained and focussing of the light 51 on the CCD 18 cannot be performed for the entire image during scanning.

Consequently, only a portion of the larger films 1 can be read at a time. As a result, it is necessary for the user to reset the larger films 1 in the holder 5 and repeat the scanning process. Since the image scanning process is time-consuming, the user is required to unnecessarily waste time scanning a film 1 more than one time.

Focussing and proper film 1 placement in the conventional image scanning device 300 is also affected by deformation of or other damage to the guide bar 8. A misaligned or bent guide bar 8 can cause the stage 4 to move unpredictably, thus preventing precise positioning of the film 1 and the light 51 from being properly focussed on the CCD 18. Typically, the guide bar 8 is deformed or otherwise damaged during shipping or transportation of the image scanning device 300.

SUMMARY OF THE INVENTION

Therefore, this invention provides an image scanning device that simplifies operation of the image scanning device and generates precise scanning data.

The invention provides an apparatus for easily determining the position of a film so the reading position and angle of the film can be reliably and rapidly reproduced after the film is removed from the image scanning device.

The invention further provides an image scanning device that maintains the flatness of films to be scanned, even when relatively large films are used.

The invention provides a device that prevents damage to the stage guides during shipping or other transport.

The invention achieves the above objects by providing a document holder having reference marks and/or a positioning frame so a document, such as a film or film slide, can be repeatably placed in an accurate position on the document holder. A document can be pressed between two flat plates of transparent material on the document holder to keep the document flat.

The image scanning device of this invention has a door that need not be manually opened or closed. The document holder is inserted into the image scanning device through the door and is accurately mounted to a movable stage. The stage contacts the document holder so the document holder is positioned on the stage in the same position every time the document holder is mounted to the stage. The stage can also be positioned such that the stage is fixed to a case containing the image scanning device. By fixing the stage to the case, damage to the stage and other support devices is avoided during shipping or transport.

BRIEF DESCRIPTION OF THE DRAWINGS

The invention is described hereafter with reference to the drawings, in which like reference numeral refer to like elements, and wherein:

FIGS. 9(a)–9(f) each show a door and door mechanism in the image scanning device;

FIGS. 17(a)–(f) each show a specific state of the stage during operation of the image scanning device.

DETAILED DESCRIPTION OF PREFERRED EMBODIMENTS

Figure 1:
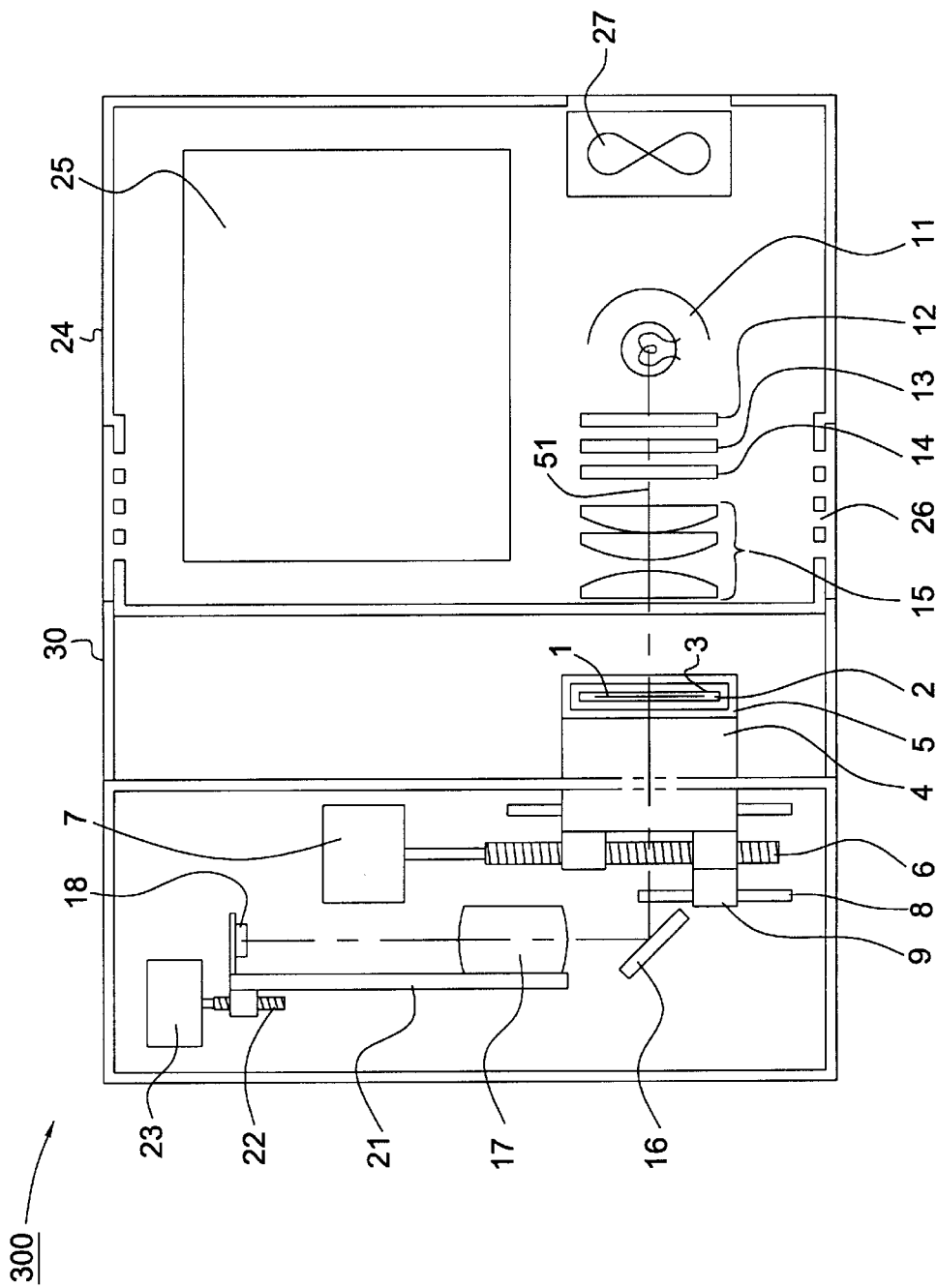
FIG. 1 shows a schematic top view of a conventional image scanning device.
Figure 2:
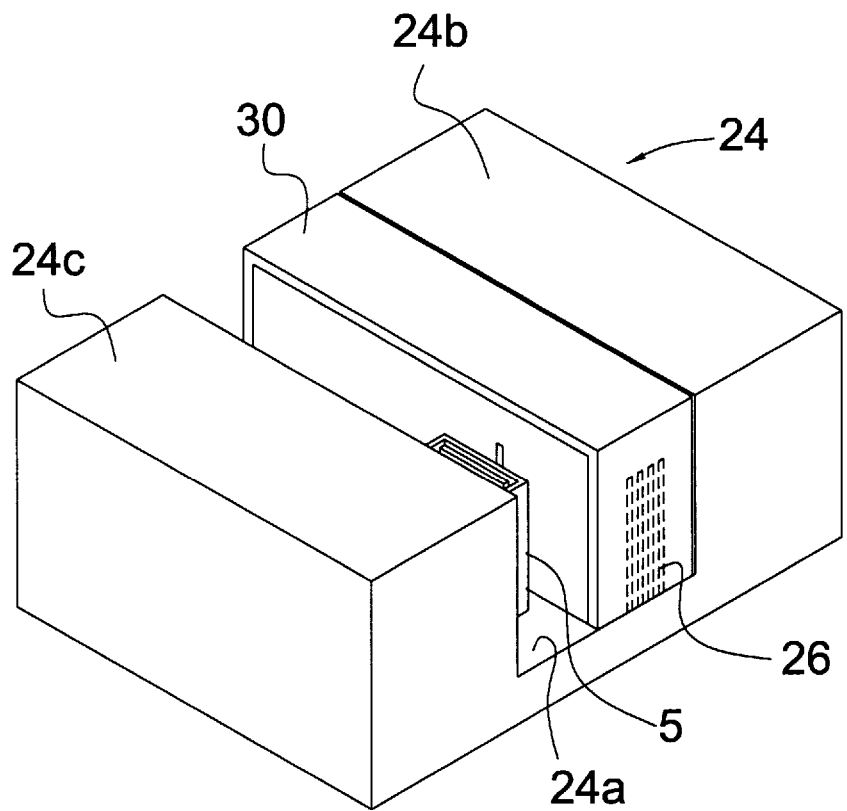
FIG. 2 shows a perspective view of the conventional image scanning device.
Figure 3:
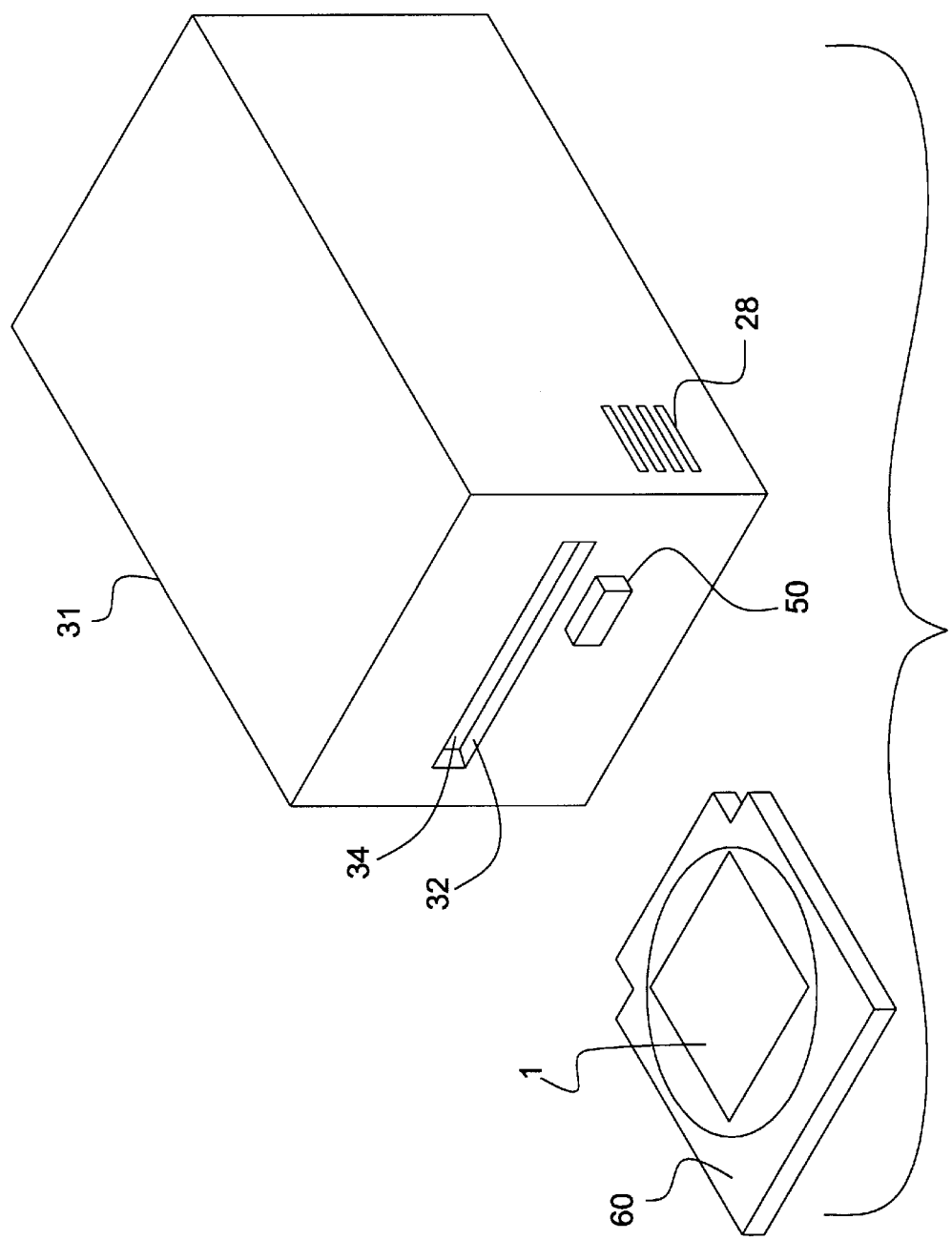
FIG. 3 shows a perspective view a document holder and a case containing a first embodiment of the image scanning device of the present invention.

FIG. 3 shows a case 31 enclosing the image scanning device of the present invention. An insertion opening 32 is provided on a front face of the case 31. A document holder 60, which holds a document having an image to be scanned, is inserted into and removed from the case 31 through the insertion opening 32. The document is preferably a film 1 or a film slide 2, but can be any other semi-transparent or reflective material.

A door 34 is attached to the case 31 near the insertion opening 32. The door 34 opens to allow insertion and removal of the document holder 60. The door 34 closes to block ambient light or foreign matter from entering the case 31 during scanning and after the document holder 60 is removed from the case 31. In addition, air intake holes 28 are formed in the case 31.

A switch 50 or similar operating device is located on the front face of the case 31 is operated by a user to remove a document holder 60 from the case 31 or to move a stage (not shown) to a fixing position where the stage is fixed to the case 31. The operation of the switch 50 is more fully described below.

Figure 4:
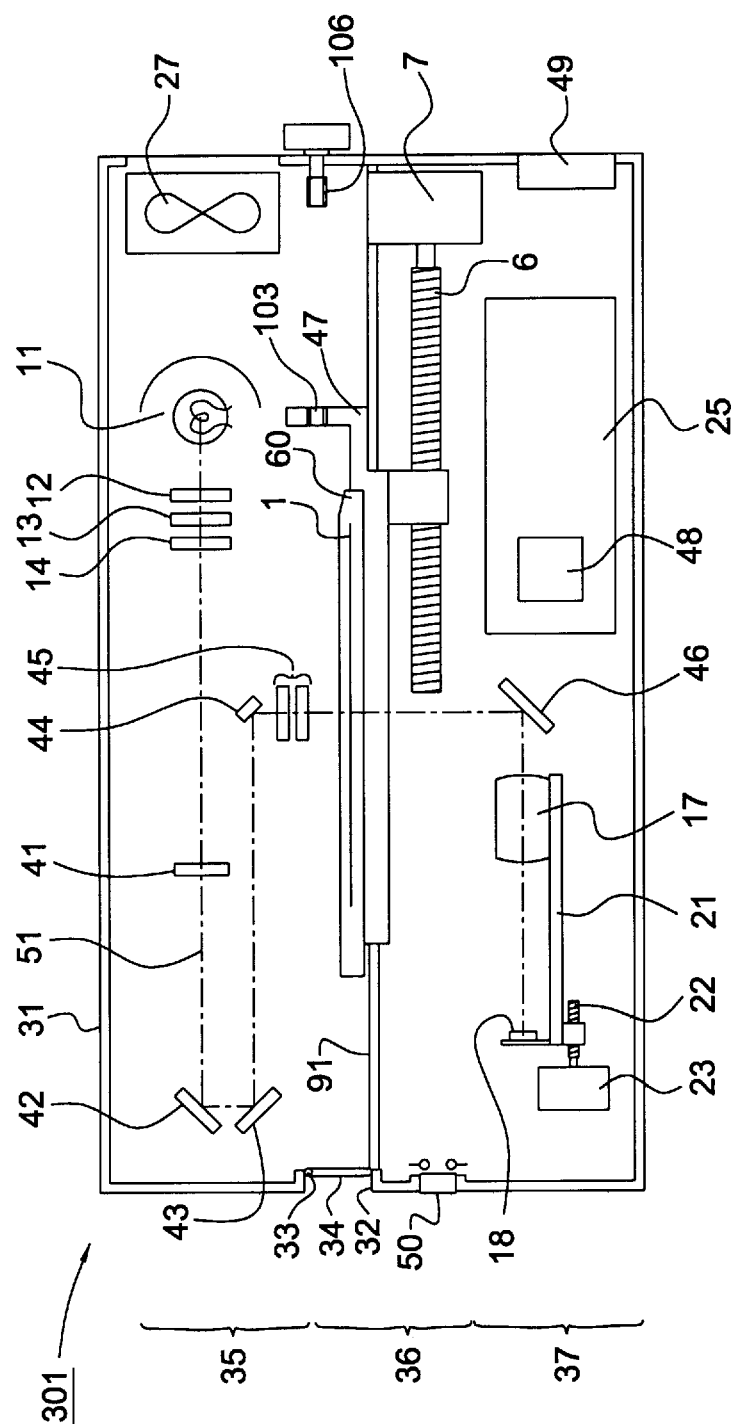
FIG. 4 shows a schematic side view of the image scanning device.

FIG. 4 shows a schematic side view of the image scanning device 301 of the present invention. The image scanning device 301 has three sections, an illumination section 35, a document drive section 36, and an image scanning section 37.

The illumination section 35 has a light source 11 that emits light 51. The light source 11 is preferably a halogen lamp, but can be one of many different types of light sources. An exhaust fan 27 draws air in through the air intake holes 28 and removes waste heat generated by the light source 11 and a power supply 25. Light 51 from the light source 11 passes through a heat absorbing filter 12, a diffusion plate 13 and a color filter unit 14.

The color filter unit 14 includes filters of different colors, such as red, green and blue, which are preferably used when an image is scanned. Scanning with different color filters allows the image scanning device 301 to generate a signal that is a color representation of the image. For example, an entire image is first scanned using a red color filter and the resulting signal is stored. Then the image is scanned using a green color filter and a blue color filter. The image can also be scanned without using a color filter unit 14.

The light 51 from the color filter unit 14 passes through a condenser lens 41, preferably a Fresnel-type condenser lens. Other types of lenses, such as convex-plano condenser lenses can also be used. After passing through the condenser lens 41, the light 51 is reflected by a first mirror 42, a second mirror 43 and a third mirror 44. The third mirror 44 directs the light 51 toward a condenser lens unit 45. Preferably, the condenser lens unit 45 comprises a pair of Fresnel-type condenser lenses, but can include other types or combinations of different lenses. The first condenser lens 41 and the condenser lens unit 45 cooperate to collimate individual light rays comprising the light 51 and provide uniform illumination of the film 1.

Light 51 passing through the condenser lens unit 45 enters the document drive section 36 and illuminates the film 1, which is mounted on the document holder 60. The document holder 60 is inserted into the case 31 through the insertion opening 32. The door 34 is mounted to the case 31 by a hinge unit 33 and opens to allow insertion of the document holder 60. Once inserted into the case 31, the document holder 60 is supported by a stage 47. The stage 47 is driven by a lead screw 6 and a stage motor 7 in a direction perpendicular to the light 51 striking the film 1. Since the light 51 illuminates only a small portion of the film 1, the film 1 must be moved perpendicularly relative to the light 51 to scan the entire film 1. The direction of the stage 47 is driven by the stage motor 7 is the sub-scanning direction.

The stage 47 rides on a pair of guide bars 91 extending from a rear of the case 31 to the front face of the case 31. The stage 47 can be moved to the rear of the case 31 and fixed to the case 31 by a screw 106 that engages with a threaded hole 103 formed in the stage 47. Fixing the stage 47 to the case 31 avoids damage to the guide bars 91 during shipping or transport.

Light 51 passing through the film 1 enters the image scanning section 37. The light 51 is reflected by a fourth mirror 46 and passes through a lens 17, striking a charge-coupled device sensor array (CCD) 18. The CCD 18 is preferably a linear array, but can also be a two-dimensional area array. Since the CCD 18 is not typically as large in area as the image on the film 1 to be scanned, only a thin rectangular portion of the film 1 can be scanned in the main scanning direction by the CCD 18 at a time. After one portion of the film 1 is scanned by the CCD 18 in the main scanning direction, the film 1 is moved by the stage 47 in the sub-scanning direction and the next portion of the film 1 is scanned by the CCD 18.

The lens 17 and the CCD 18 are mounted to a support member 21 that is driven by a lead screw 22 and a focus drive 23. The focus drive 23 and lead screw 22 move the support member 21 to properly focus the light 51 on the CCD 18.

A controller 48 controls the components of the image scanning device 301. An interface 49 provides communication between the image scanning device 301 and an image processor, preferably a general purpose host computer. The switch 50 communicates with the controller 48.

In this preferred embodiment, the controller 48 is implemented as a single special purpose integrated circuit (e.g. an ASIC) having a main or central processor section for overall, system-level control, and separate sections dedicated to performing various different specific computations, functions and other processes under control of the central processor section. It will be appreciated by those skilled in the art that the controller 48 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller 48 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. A distributed processing architecture is preferred for maximum data/signal processing capability and speed.

Figure 5:
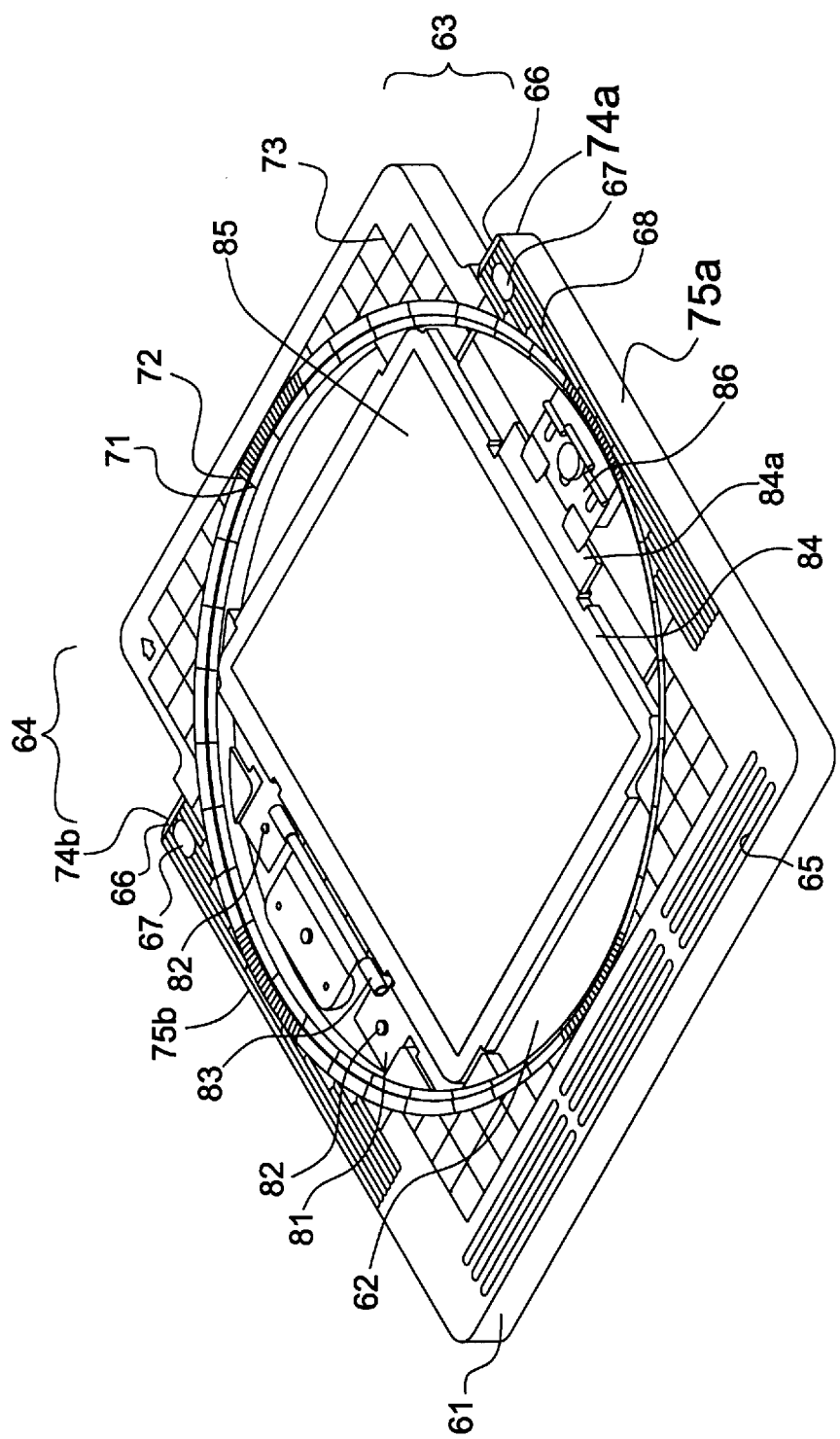
FIG. 5 shows a perspective view of a document holder used in the first embodiment of the image scanning device.

FIG. 5 shows a document holder 60 used with a first embodiment of the image scanning device 301 of the present invention. The document holder 60 has a thin, nearly square plate forming a frame 61. A turntable 62 is supported in the center of the frame 61 and is free to rotate relative to the frame 61. Grooves 65 formed in the frame 61 provide an improved grip for a user when handling the document holder 60. Preferably, the frame 61 and the turntable 62 are made of resin.

A right front face wall 74a defines one side of a right notch 63 formed in the frame 61. A left front face wall 74b defines one side of a left notch 64 formed in the frame 61. The right notch 63 and the left notch 64 are asymmetrical in shape. The frame 61 also has right and left side walls 75a and 75b that define right and left edges of the frame 61.

Inclined surfaces 66 and position-determining holes 67 are formed in the frame 61 near both the left and right notches 64 and 63. The position-determining holes 67 are preferably oval holes, but can be made in other shapes, such as circular, square, rectangular, etc. Sliding surfaces 68 are formed on the frame 61 and are raised above the top of the frame 61. An angle indicator 71 is provided around the outer perimeter of the turntable 62, and an angle scale 72 is provided on the frame 61. In addition, a plotting scale 73 is provided on the frame 61 around the turntable 62.

A hinge 83 fixed to one side of the turntable 62 supports a frame member 84 that supports a glass plate 85. The hinge 83 allows the frame member 84 and the glass plate 85 to be opened and closed. FIG. 5 shows the frame member 84 and the glass plate 85 in the closed state. A locking unit 86 is provided on the turntable 62 opposite the hinge 83. The locking unit 86 engages with a tip 84a of the frame member 84 when the tip 84a is pressed against the locking unit 86. Shafts 82 formed on the turntable 62 engage with holes in a mask 81, which is removably mounted to the turntable 62 beneath the frame member 84 and the glass plate 85. The shafts 82 serve to properly position the mask 81 relative to the turntable 62.

Figure 6:
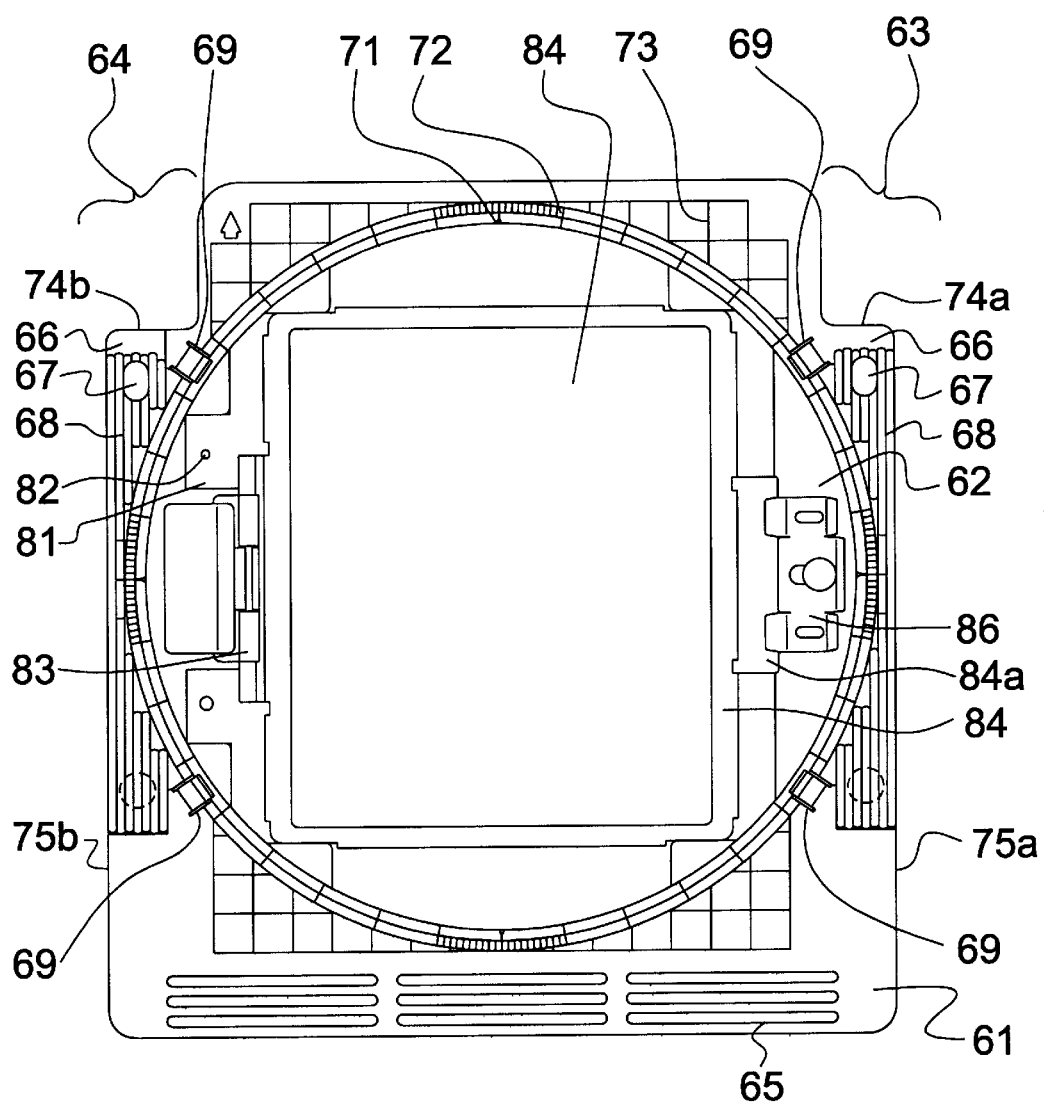
FIG. 6 shows a top view of the document holder used in the first embodiment of the image scanning device.

FIG. 6 shows a plurality of hooks 69 formed on the frame 61 around the turntable 62. The hooks 69 prevent the turntable 62 from being separated from the frame 61, but do not inhibit the rotation of the turntable 62. The sliding surfaces 68 formed nearest the turntable 62 define a stair-like shape that duplicates the scale pattern defined by the plotting scale 73.

Figure 7:
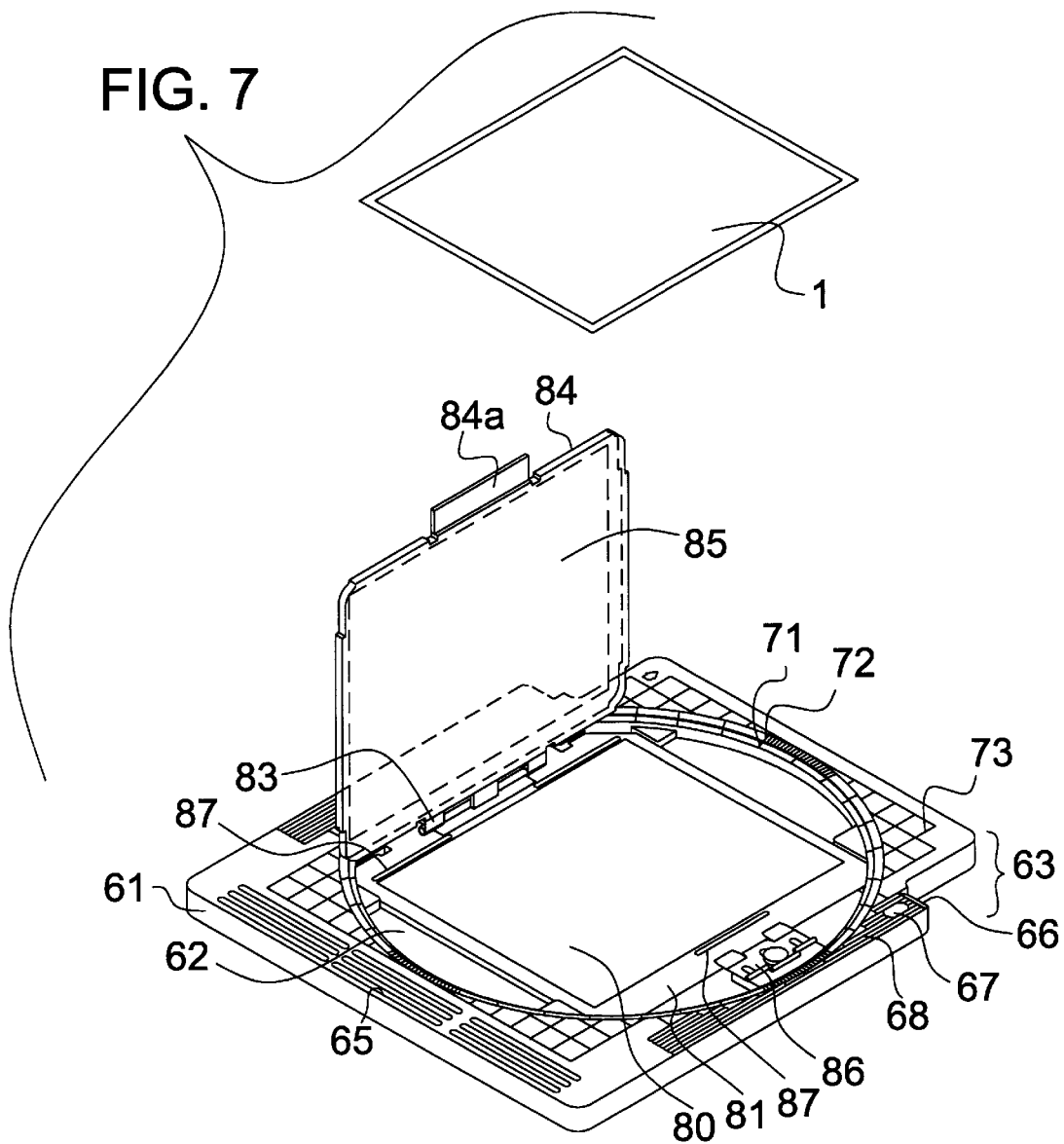
FIG. 7 shows a perspective view of a frame of the document holder used in the first embodiment of the image scanning device in an open state.

FIG. 7 shows the frame member 84 and the glass plate 85 in the open state. An opening (not shown) formed in the bottom of the turntable 62 is covered by a glass plate 80 fixed to the turntable 62. The mask 81 is opaque and defines a shape (e.g. rectangular as shown in FIG. 7) corresponding to the size and shape of the film 1 to be scanned. The mask 81 also has a position matching unit 87 that provides a reference point for a user when placing the film 1 on the mask 81. As mentioned above, the mask 81 is removably mounted to the shafts 82. Therefore, the mask 81 can be removed and replaced with another mask 81 to accommodate films 1 of different sizes.

Before loading the film 1 into the document holder 60, the locking unit 86 must be activated to release the tip 84a of the frame member 84. When the tip 84a is released, the frame member 84 and the glass plate 85 can be opened as shown in FIG. 7. The mask 81 on the glass plate 80 is switched to one that corresponds to the size of the film 1, and the film 1 is placed on the mask 81 matching the position matching unit 87. The frame member 84 is then closed, and the locking unit 86 is fixed. By closing the frame member 84, the film 1 is held between the two glass plates 80 and 85 and flatness of the film 1 is maintained.

The mask 81 blocks light 51 other than that passing through the film 1 during scanning, so accurate scanning data is obtained. When the mask 81 is not used, the position matching unit 87 is not available to ensure the film 1 is properly aligned with the document holder 60. However, the position of the film 1 can be determined by using the plotting and angle scales 73 and 72 of the frame 61.

Figure 8:
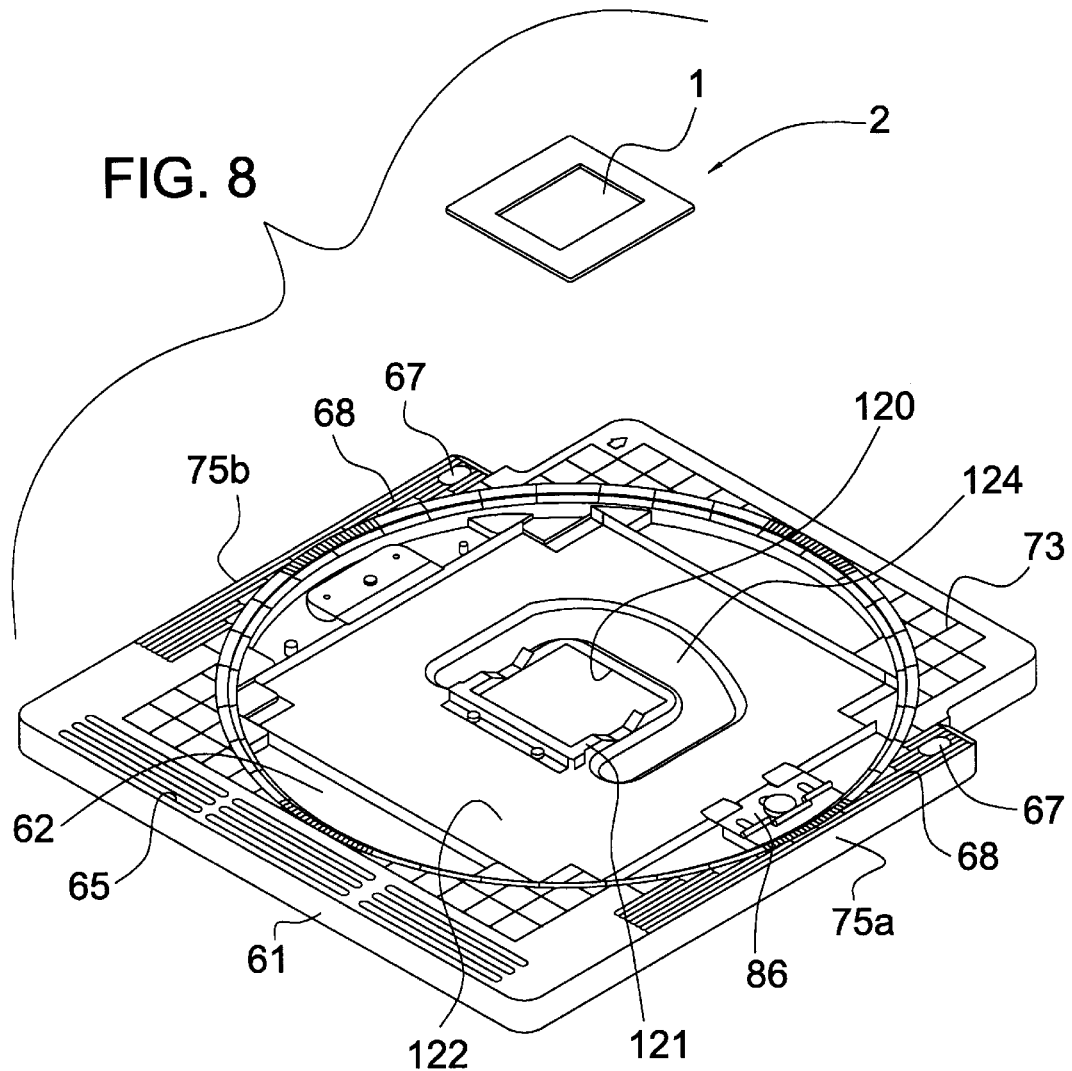
FIG. 8 shows a perspective view of the document holder used in the first embodiment of the image scanning device configured for holding 35 mm film slides.

FIG. 8 shows a configuration of the document holder 60 that is used when scanning film slides 2. The frame 61 and the turntable 62 of the document holder 60 are not altered. The frame member 84, the mask 81 and the two glass plates 80 and 85 are replaced by a tray 122. The tray 122 has an opening 120 formed near the center of the tray 122. A plate spring 121 is fixed to the tray 122 near the opening 120. A concave section 124 is formed in the tray 122 around the outside of the opening 120 for receiving a film slide 2. The film slide 2 is inserted into the concave section 124 of the tray 122 beneath the plate spring 121 so the image on the film 1 corresponds to the opening 120.

Therefore, placement of a film slide 2 on the document holder 60 can be duplicated after removing the film slide 2 from the document holder 60. Duplicating the position of the film slide 2 on the document holder 60 also enables a user to reproduce the reading range for the film slide 2 without the time required in conventional image scanning devices 300.

Once the film 1 is mounted to the document holder 60, the document holder 60 is inserted into the case 31 through the insertion opening 32. As mentioned above, the door 34 is attached to the case 31 by the hinge unit 33. The hinge unit 33 can take many forms in addition to a simple hinge. FIGS. 9(a)–(f) show six of the many different types of hinge units 33 that are possible.

FIG. 9(a) shows a hinge unit 33 that has a shaft 133 fixed to the door 34. The shaft 133 is rotatably mounted to the case 31 near the top of the insertion opening 32. A semicircular plate cam 130 is fixed off-center to the shaft 133. A flat section 130a is formed in the cam 130 at the outer perimeter of the cam 130 so the flat section 130a is parallel to the door 34. A top end of a plate spring 131 is fixed to the case 31. A bottom end of the plate spring 131 contacts the outer perimeter of the cam 130.

Therefore, when the door 34 is closed, as shown in FIG. 9(a), the bottom end of the plate spring 131 elastically contacts the flat section 130a of the cam 130. Contact between the plate spring 131 and the flat section 130a stabilizes the door 34 in the closed position. When the door 34 is opened by inserting a document holder 60 though the insertion opening 32, the cam 130 rotates relative to the plate spring 131. The plate spring 131 presses against the cam 130 and generates a moment which urges the cam 130 and the door 34 to rotate toward the closed position.

FIG. 9(b) shows a hinge unit 33 in which the door 34 is fixed to a shaft 133. The shaft 133 is rotatably mounted to the case 31 near the top of the insertion opening 32. The shaft 133 has an arm 132 that extends parallel to and away from the door 34. A pin 150 extends from the arm 132 parallel to the shaft 133. Lower portions of a pair of wire springs 134a and 134b contact the shaft 133 and the pin 150. A top end of the wire springs 134a and 134b are fixed to the case 31. Therefore, when the door 34 is rotated from the closed position, the wire springs 134a or 134b exert a force on the pin 150 and bias the door toward the closed position.

FIG. 9(c) shows a hinge unit 33 having a shaft 133 fixed to the door 34 and rotatably mounted to the case 31. An arm 132 extends from the shaft 133 parallel to and away from the door 34. A top end of a tension coil spring 136 is fixed to the case 31. A bottom end of the tension coil spring 136 is attached to a hole 135 formed in the arm 132. Therefore, when the door 34 is rotated from the closed position, the tension coil spring 136 exerts a force on the arm 132 that biases the door 34 toward the closed position.

FIG. 9(d) shows a hinge unit 33 that has a rotary-type solenoid 138 fixed to the case 31. The rotary-type solenoid 138 engages with a coupling 137 connected to a shaft 133. The shaft 133 is fixed to the door 34. The controller 48 actuates the rotary-type solenoid 138 to rotate the door 34 between the closed and open positions.

FIG. 9(e) shows a hinge unit 33 having a gear 139 fixed to a shaft 133. The shaft 133 is fixed to the door 34. A gear 142 fixed to a motor shaft 141 of a motor 140 engages with the gear 139. The controller 48 actuates the motor 140 to drive the door 34 between the open and closed positions.

FIG. 9(f) shows a hinge unit 33 having a semicircular plate cam 143 fixed to a top edge of the door 34. Two shafts 144 and 145 are fixed to the plate cam 143. A support plate 146 is fixed to the case 31 and has a step-like profile that contacts the shafts 144 and 145 when the door 34 is in the closed position. A top end of a plate spring 131 is fixed to the case 31. A bottom end of the plate spring 131 elastically contacts the outer perimeter of the plate cam 143.

When the door 34 rotates in a clockwise direction, the shaft 145 becomes the center of rotation. In contrast, when the door 34 rotates is a counterclockwise direction, the shaft 144 becomes the center of rotation. In both cases where the door 34 rotates clockwise and counterclockwise, the plate spring 131 exerts a force on the cam 143 that biases the door 34 toward the closed position.

Figure 10:
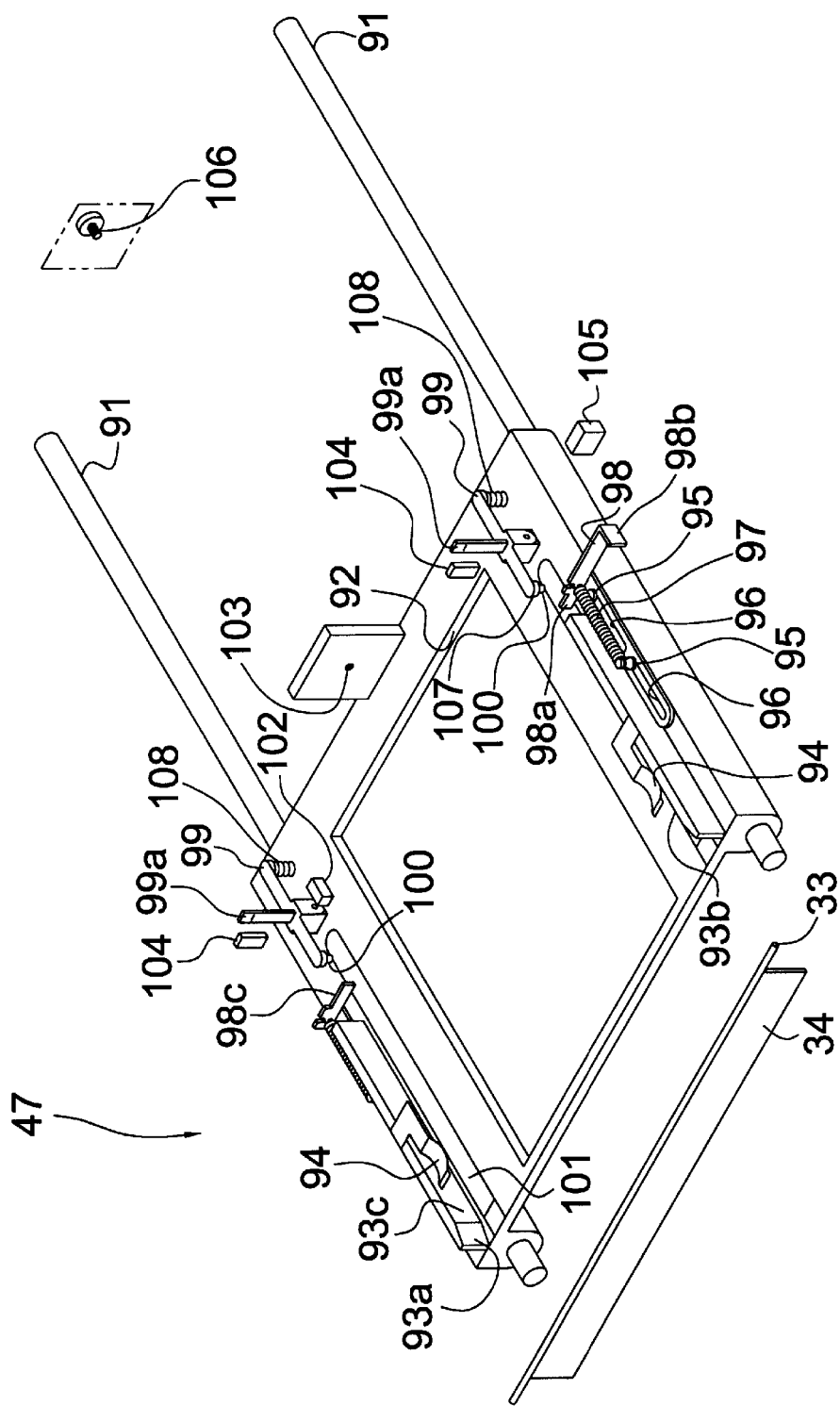
FIG. 10 shows perspective view of the stage in the first embodiment of the image scanning device.

When the document holder 60 is inserted through the insertion opening 32, the document holder 60 engages with the stage 47 that is positioned behind the door 34. FIG. 10 shows a perspective view of the stage 47. The stage 47 slides along and is guided by the guide bars 91. An opening 92, which corresponds to the film 1 reading range, is provided in the center of the stage 47.

Right and left side walls 93b and 93c extend from a front of the stage 47 toward a rear of the stage 47. The right and left side walls 93b and 93c contact the corresponding right and left side walls 75a and 75b on the document holder 60 when the document holder 60 is slid onto the stage 47. By contacting the right and left side walls 75a and 75b on the document holder 60, the side walls 93b and 93c accurately position the document holder 60 on the stage in a direction perpendicular to the stage 47 movement. A tapered section 93a is formed in the right and left side walls 93b and 93c near the front of the stage 47. The tapered sections 93a guide the document holder 60 when a user slides the document holder 60 onto the stage 47.

A pair of rails 101 are formed near the right and left side walls 93b and 93c and support the bottom of the document holder 60. A pair of plate springs 94 are provided on the right and left side walls 93b and 93c. The plate springs 94 contact the sliding surfaces 68 on the document holder 60 and urge the document holder 60 toward the rails 101. This ensures the document holder 60 is accurately positioned in a vertical direction.

A pair of return members 98 are provided to the rear of the right and left side walls 93b and 93c. The return members 98 are slidable relative to the stage 47 in a direction parallel to the rails 101. The return members 98 have oval holes 96 that are guided by shafts 95. Tension springs 97 engage with a corresponding shaft 95 and urge the return members 98 toward the front of the stage 47. Arms 98a and 98c protrude inward from the return members 98. The arms 98a and 98c contact the right and left front face walls 74a and 74b, respectively, and urge the document holder 60 toward the front of the stage 47.

A reflective-type photoelectric sensor 105 is fixed to the case 31. The reflective-type photoelectric sensor 105 detects light reflecting from the reflecting unit 98b on the right return member 98 when the document holder 60 is inserted into the stage 47.

To the rear of the return members 98 are rocker members 99. The rocker members 99 are rotatably mounted to the stage 47 and have a position-determining pin 100 provided on a front tip of each rocker member 99. A coil spring 108 urges each rocker member 99 to rotate so the position-determining pin 100 is forced toward a corresponding rail 101. Each rocker member 99 also has an arm 99a extending away from the stage 47. The arms 99a contact stops 104 fixed to the case 31 when the stage moves toward the door 34. Contact between the stops 104 and the arms 99a causes the rocker members 99 to rotate so the position-determining pins 100 are moved away from the rails 101. A protrusion 102 is also formed inside of the left rocker member 99 to prevent the document holder 60 from being inserted too far onto the stage 47.

A screw 106 is supported on a back surface of the case 31 so the screw 106 is free to rotate. The screw 106 is positioned so the screw 106 can engage with a threaded hole 103 formed in the stage 47 when the stage is moved to the rear of the case 31. Engaging the screw 106 with the threaded hole 103 fixes the stage 47 to the case 31, thereby preventing damage to the guide bars 91 during shipping or transport.

Figure 11:
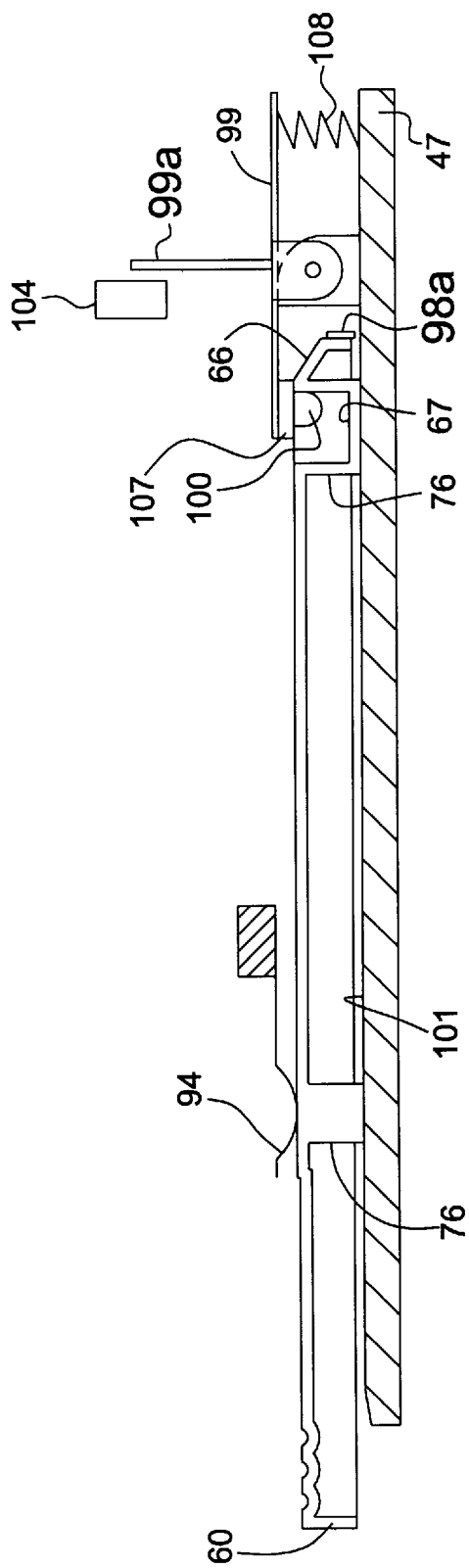
FIG. 11 shows a side view of the document holder mounted to the stage in the first embodiment of the image scanning device.

FIG. 11 shows a sectional side view of the stage 47 having a document holder 60 slid onto the stage 47. The rails 101 contact legs 76 formed on the bottom of the document holder 60. Other portions of the stage 47 do not contact the bottom of the document holder 60. Any debris or other foreign matter on the rails 101 is removed when the legs 76 of the document holder 60 slide along the rails 101. Therefore, the surface of the film 1 is maintained parallel with the stage 47 even when foreign matter is deposited on the rails 101.

The distance between the rails 101 and the guide bars 91 is precisely maintained along the entire length of the rails 101. In addition, the plurality of legs 76 provided on the bottom of the document holder 60 are made to be equidistant from the surface of the glass 80 on which the film 1 is mounted. Therefore, the document holder 60 is accurately positioned in the vertical direction by the stage 47.

The sliding surfaces 68 of the document holder 60 that contact the plate spring 94 extend above other portions of the document holder 60 and are formed with high precision. Therefore, the distance from the bottom surface of the legs 76 to the sliding surfaces 68 is uniform along the length of the document holder 60. As a result, the document holder 47 is held against the stage 47 by equal forces exerted by the plate springs 94.

As shown in FIG. 11, when the document holder 60 is slid onto the stage 47 against the force of the return members 98, the position-determining pins 100 slide up the inclined surfaces 66, rotating the rocker members 99 against the force of the coil springs 108. The position-determining pins 100 then insert into the position-determining holes 67 under the force of the coil springs 108 as the document holder 60 is further slid onto the stage 47.

When the user inserting the document holder 60 onto the stage 47 stops pushing the document holder 60 into the case 31, the return members 98 slide the document holder 60 toward the front of the stage 47 until the position-determining pins 100 contact the sides of the position-determining holes 67, as shown in FIG. 11. Accordingly, the document holder 60 is positioned in the same place on the stage 47 every time the document holder 60 is mounted on the stage 47.

As mentioned above, the document holder 60 is released from the stage 47 when the stage 47 moves so the arms 99a contact the stops 104, rotating the rocker members 99 against the force of the coil springs 108 and disengaging the position-determining pins 100 from the position-determining holes 67.

Figure 12:
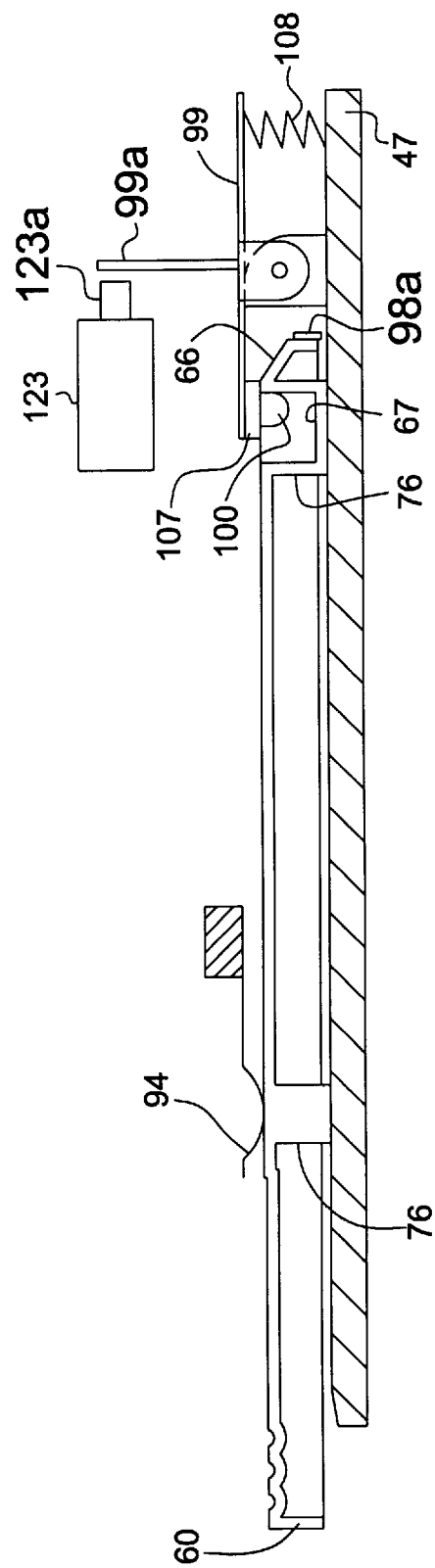
FIG. 12 shows a side view of the document holder mounted to the stage and a device for disengaging the document holder from the stage in the first embodiment of the image scanning device.

FIG. 12 shows an alternative mechanism for releasing the document holder 60 from the stage 47. With the device shown in FIG. 12, release of the position-determining pins 100 from the position-determining holes 67 is performed by plunger-type solenoids 123. The plunger-type solenoids 123 are actuated by the controller 48 to move a plunger 123a into contact with a corresponding arm 99a on a rocker member 99. The plungers 123a force the rocker arms 99 to rotate against the force of the coil springs 108, disengaging the position-determining pins 100 from the position-determining holes 67. The plunger-type solenoid 123 can be replaced by other mechanisms, such as a motor and cam, or the like.

Use of the plunger-type solenoids 123 decreases the size of the image scanning device 301 since it is not necessary to move the stage 47 to disengage the document holder 60 from the stage 47. This means the guide bars 91 can be made shorter, thereby decreasing the size of the image scanning device 301.

Figure 13:
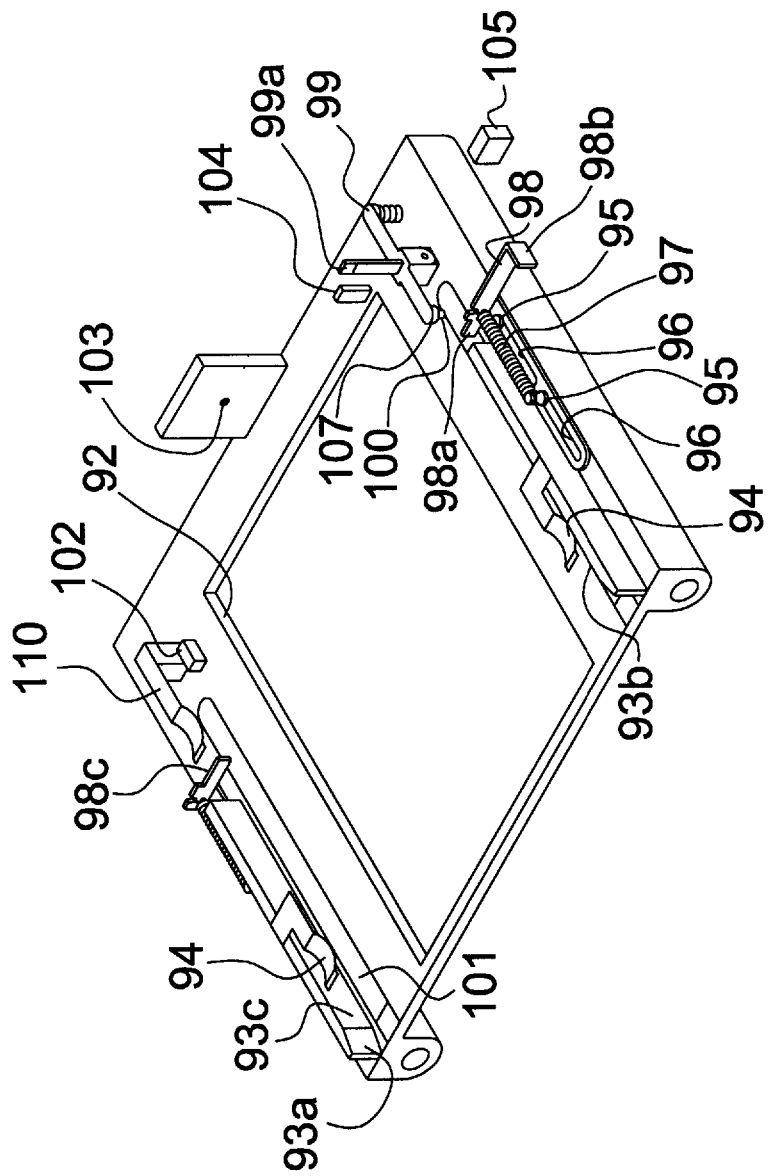
FIG. 13 shows a perspective view of a stage in a second embodiment of the image scanning device of the present invention.

FIG. 13 shows a second embodiment of the image scanning device 301 of the present invention. In the second embodiment, the left rocker member 99 is replaced by a single plate spring 110. Otherwise, the stage 47 is identical to the stage 47 in the first embodiment.

Figure 14:
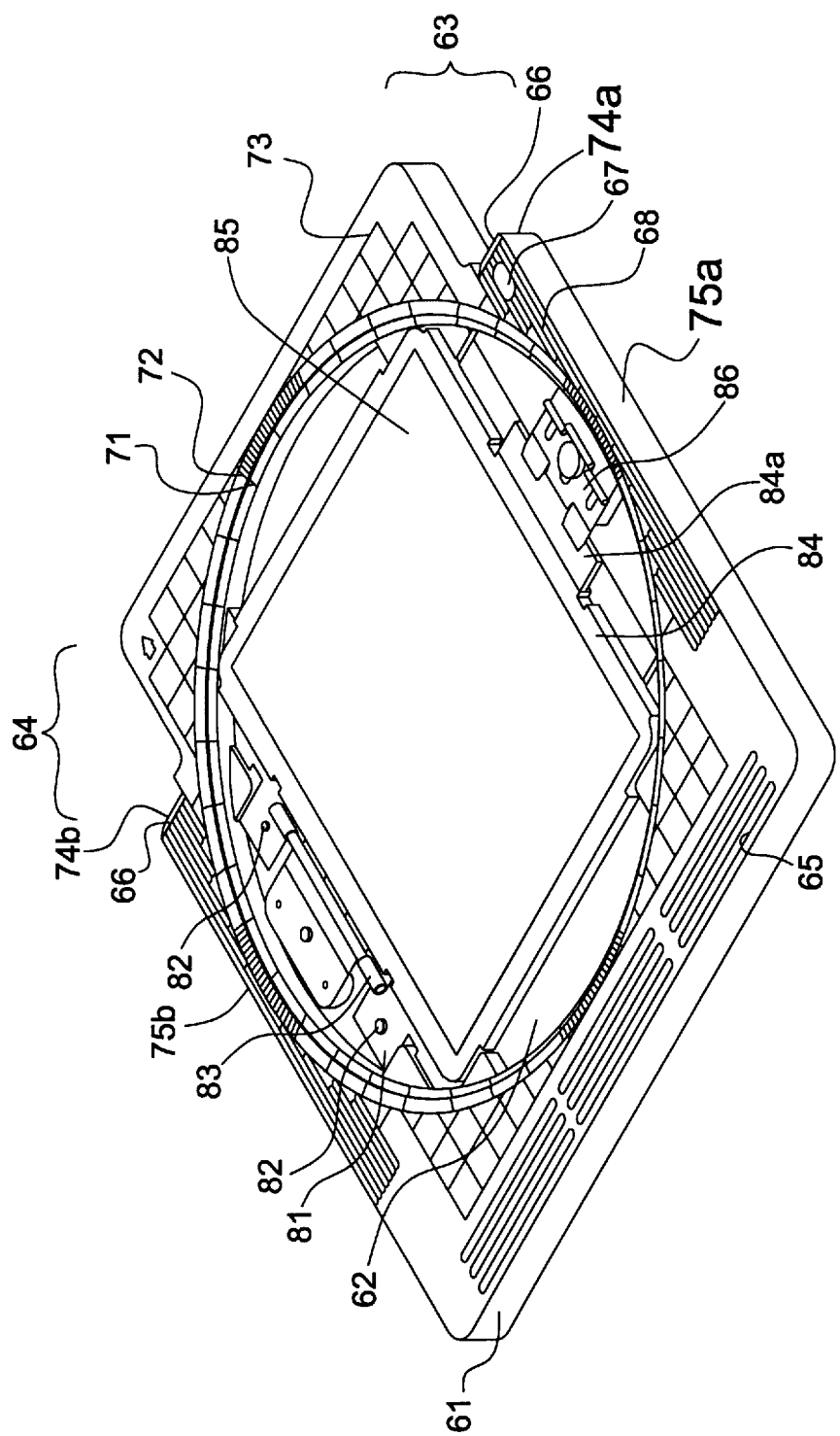
FIG. 14 shows a perspective view of a document holder used in the second embodiment of the image scanning device.

FIG. 14 shows a document holder 60 for use with the second embodiment of the image scanning device 301. The document holder 60 is identical to the document holder 60 used with the first embodiment except that a position-determining hole 67 is not formed on the right side of the document holder 60.

Figure 15:
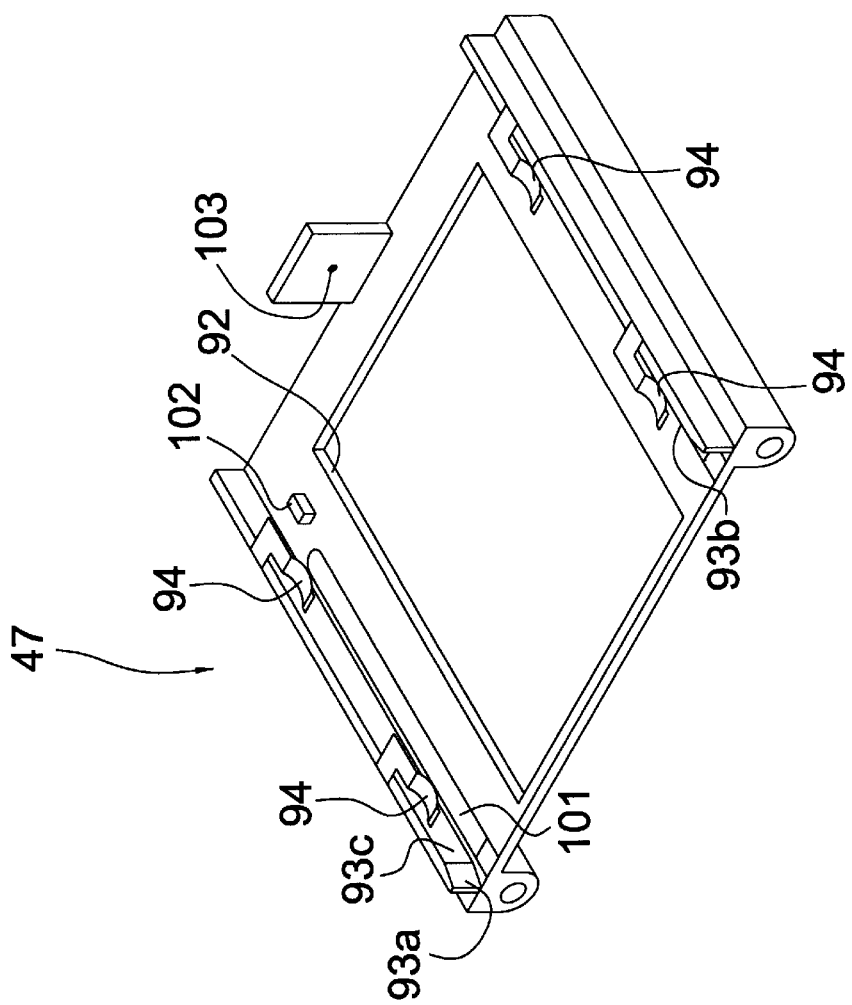
FIG. 15 shows a perspective view of a stage in a third embodiment of the image scanning device of the present invention.

FIG. 15 shows a third embodiment of the image scanning device 301 of the present invention. In the third embodiment, the return members 98 and rocker members 99 are replaced with an additional pair of plate springs 94. The right and left side walls 93b and 93c are also extended to the rear of the stage 47. The position of the document holder 60 is maintained by contact between the right and left side walls 93b and 93c with the right and left side walls 75a and 75b and by contact between the front of the document holder 60 and the protrusion 102. Friction between the side walls 93b and 93c on the stage 47 and the side walls 75a and 75b on the document holder 60 and between the legs 76 and the rails 101 also help to maintain proper positioning of the document holder 60.

Figure 16:
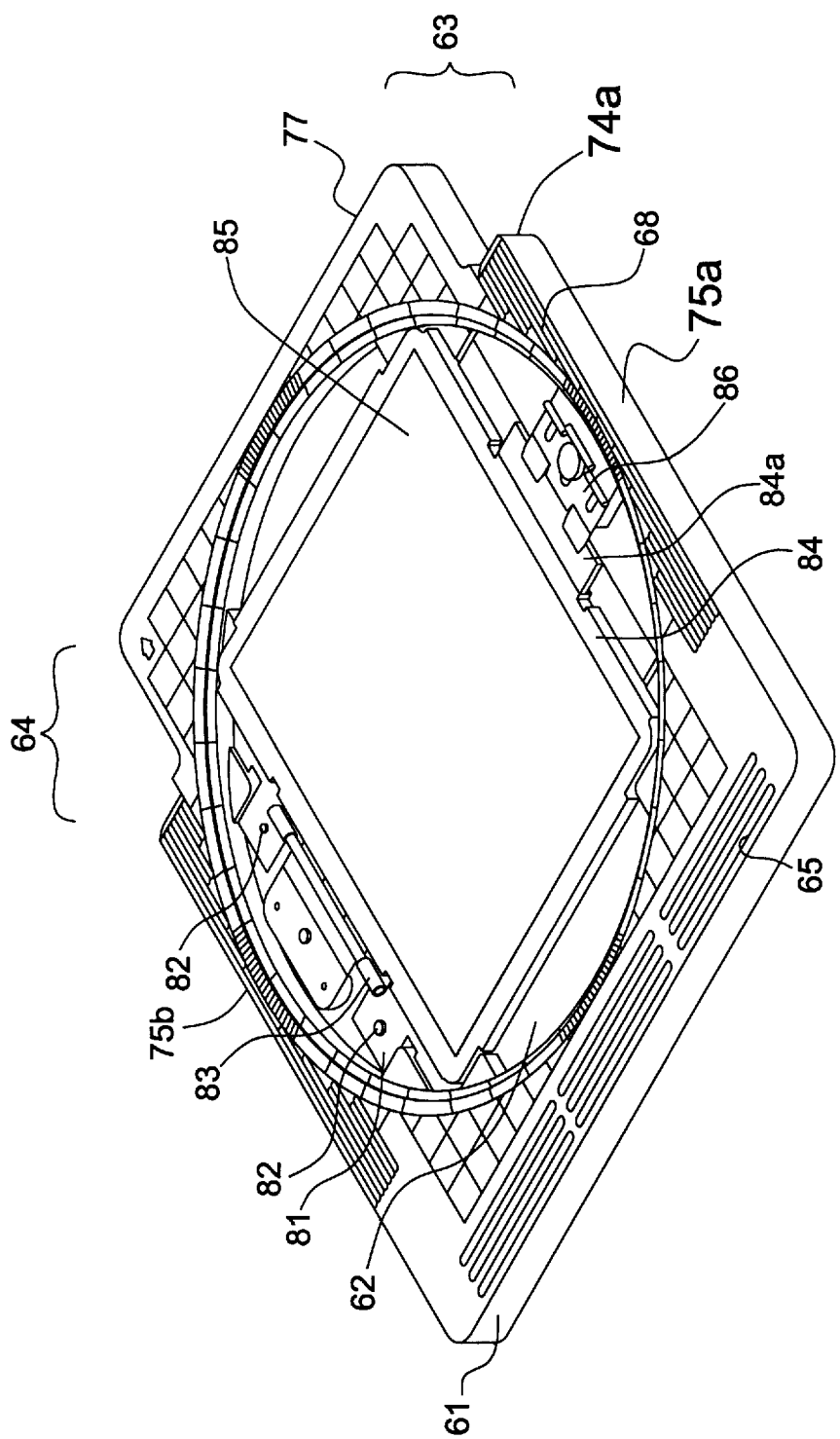
FIG. 16 shows a perspective view of a document holder used with the third embodiment of the image scanning device.

FIG. 16 shows a document holder 60 for use with the third embodiment. The document holder 60 is identical to the document holder 60 used with the first and second embodiments, except that the position-determining holes 67 are not formed in the document holder 60.

FIGS. 17(a)–(f) schematically show the movement of the stage 47 during scanning of the film 1. FIG. 17(a) shows the stage 47 in an insertion standby position. The controller 48 moves the stage 47 to the insertion standby position when the switch 50 is pressed. When the stage 47 is in the insertion standby position, the separation between the arms 99a of the rocker members 99 and the stops 104 is preferably 1.5 mm. Since the document holder 60 is not yet inserted, the door 34 is closed. When the stage 47 is in the insertion standby position, the stage 47 does not interfere with the light 51 passing through the document drive section 36 along a scanning plane 200. Therefore, shading data for the light 51 can be set.

FIG. 17(b) shows the document holder 60 inserted into the case 31 through the door 34. When the hinge unit 33 for the door 34 is a simple hinge mechanism or spring-loaded closing device, such as is shown in FIGS. 9(a)–(c) and 9(f), the user inserts the document holder 60 through the insertion opening 32, forcing the door 34 to rotate counterclockwise and open the insertion opening 32. The user then slides the document holder 60 onto the stage 47, as described above.

When the hinge unit 33 for the door 34 is an electromechanical device such as that shown in FIGS. 9(d) and 9(e), the controller 48 sends a signal to the hinge unit 33 to open the door 34. Once the door 34 is open, the user slides the document holder 60 onto the stage 47.

Once the document holder 60 is fully inserted onto the stage 47, the reflective-type photoelectric sensor 105 detects the presence of the reflection unit 98b and outputs an engagement stop detection signal to the controller 48. The engagement stop detection signal verifies to the controller 48 the document holder 60 is completely loaded onto the stage 47.

After the controller 48 receives the engagement stop detection signal from the reflective-type photoelectric sensor 105, the controller 48 controls the stage motor 7 to move the stage 47 toward the back of the case 31. The driving force of the stage motor 7 is transferred to the stage 47 via the lead screw 6, and the stage 47 moves to the image reading start position, as shown in FIG. 17(c). The image reading start position is the position where the film 1 reaches the scanning plane 200. The controller 48 controls the position of the stage 47 based on signals received from a stage position detection member (not shown) and a driving pulse number of the stage motor 7. The door 34 closes either by gravity, spring mechanism or by the controller 48 sending a close signal to the hinge unit 33 when the document holder 60 moves into the case 31.

Once the stage 47 reaches the image reading start position, the image processor and the controller 48 control the image scanning device 301 to scan the image on the film 1. FIG. 17(d) shows the document holder 60 and the stage 47 in the reading end position after the entire image on the film 1 has been scanned.

While the film 1 is being scanned, the door 34 remains closed. Therefore, dust or ambient light outside is the case 31 is prevented from entering the case 31 and interfering with image scanning. In addition, because the door 34 closes automatically with the movement of the stage 47 to the image reading start position, the user need not remember to close the door 34.

After scanning of the film 1 is complete, the user can control the stage 47 to move to an ejection position shown in FIG. 17(e) by pressing the switch 50. Alternately, the image processor and controller 48 can control the stage 47 to move to the ejection position immediately after scanning is complete.

Since the switch 50 is part of the image scanning device 301, the user can retrieve the document holder 60 from the case 31 even if the power source for the image processor is interrupted or if the image processor is not linked to communicate with the image scanning device 301. That is, the user can remove the document holder 60 without using the image processor.

When the stage 47 moves to the ejection position, the stops 104 contact the arms 99a of the rocker members 99. The stops 104 force the arms 99a toward the rear of the stage 47, causing the position-determining pins 100 to disengage from the position-determining holes 67. When this occurs, the document holder 60 is forced out of the case 31 by the arms 98a and 98c of the return members 98. The back edge of the document holder 60 forces the door 34 to open as the return members 98 force the document holder out of the case 31. Alternately, the controller 48 controls the hinge unit 33 to open the door 34 when the stage 47 moves to the ejection position. The user can then grasp the rear edge of the document holder 60 and remove the document holder 60 from the insertion opening 32.

FIG. 17(f) shows the stage 47 in the fixed position. When the image input device 101 is shipped, it is preferable to fix the stage 47 to the case 31 to avoid damage to the stage 47 and the guide bars 91. The user controls the controller 48 to move the stage 47 to the fixing position by pressing and holding the switch 50 for at least three seconds or by controlling the image processor to output a fixing position signal to the controller 48.

When the switch 50 is pressed and held for at least 3 seconds, the controller 48 determines that the switch 50 is outputting a fixing position signal. When this occurs, the controller 48 controls the stage motor 7 to drive the stage 47 to the rear of the case 31. When the stage reaches the fixing position shown in FIG. 17(f), the controller 48 stops driving the stage motor 7. In the fixing position, the stage 47 is outside the scanning plane 200.

By engaging the screw 106 with the threaded hole 103 in the stage 47, the stage 47 is fixed to the case 31. After shipping, the stage 47 is released from the case 31 by disengaging the screw 106 from the threaded hole 103.

Because the switch 50 is a part of the image scanning device 301, the user can command the controller 48 to move the stage 47 to the fixing position even if the power source of the image processor is interrupted or if the image processor is not linked to communicate with the controller 48.

In the embodiment of the invention described above, the controller 48 determines whether the signal output by the switch 50 is an ejection signal or a fixing position signal based of the length of the time the switch 50 is operated. Consequently, when the user decides to transport the image scanning device 301 after scanning a film 1, the user can press and hold the switch 50. When this occurs, the controller 48 first detects an ejection signal and moves the stage 47 to the ejection position so the user can remove the document holder 60. If the user continues to press the switch 50, the controller 48 detects the fixing position signal and moves the stage 47 to the fixing position. Therefore, the user can execute a series of processes by a single operation of the switch 50. Alternately, the controller 48 could detect the ejection signal when the switch 50 is pressed once, and detect the fixing position signal when the switch 50 is pressed twice.

While the invention has been described in connection with the preferred embodiments, it should be understood that it is not intended to limit the invention to these embodiments. On the contrary, it is intended to cover all alternatives, modifications and equivalents that may be included within the spirit and scope of the invention as defined by the appended claims.

What is claimed is:

1. An image scanning device comprising:

a document holder holding a document to be scanned, the document holder having a face wall and a holder engagement device;

an illumination device illuminating the document;

a photoelectric conversion device converting light from the document into an electronic signal; and a stage receiving, supporting and positioning the document holder, the stage having a stage engagement device, wherein when the document holder is mounted on the stage in a mounting direction, the stage engagement device engages with the holder engagement device to position the document holder relative to the stage in the mounting direction, such that one of the holder engagement device and the stage engagement device defines at least one hole and the other of the holder engagement device and the stage engagement device is at least one shaft corresponding to and insertable into the at least one hole.

2. The image scanning device of claim 1, wherein the stage further comprises a return member that contacts the face wall of the document holder when the document holder is mounted to the stage and exerts an ejection force on the document holder in an ejection direction opposite to the mounting direction, and wherein the holder engagement device and the stage engagement device resist the ejection force of the return member to position the document holder relative to the stage in the mounting direction.

3. The image scanning device of claim 2, further comprising an engagement release device wherein when the engagement release device releases the holder engagement device from the stage engagement device, the return member moves the document holder in the ejection direction relative to the stage.

4. The image scanning device of claim 2, wherein:

the document holder has a plurality of legs, and the stage has a force applying device and a pair of rails, wherein when the document holder is mounted on the stage, the force applying device forces the legs of the document holder into contact with corresponding rails on the stage.

5. The image scanning device of claim 1, wherein the holder engagement device comprises at least one hole formed in the document holder and the stage engagement device comprises at least one shaft, the at least one shaft corresponding to the at least one hole and inserting into the corresponding at least one hole.

6. The image scanning device of claim 1, wherein the holder engagement device comprises at least one shaft formed in the document holder and the stage engagement device comprises at least one hole formed in the stage, the at least one shaft corresponding to the at least one hole and inserting into the corresponding at least one hole.

7. The image scanning device of claim 1, wherein the document holder is positioned on the stage in a lateral direction perpendicular to the mounting direction by at least one stage side wall on the stage extending parallel to the mounting direction and contacting a corresponding at least one holder side wall on the document holder extending perpendicular to the face wall.

8. The image scanning device of claim 1, further comprising an engagement release device that releases the holder engagement device from the stage engagement device.

9. The image scanning device of claim 8, wherein the stage engagement device is fixed to a rocker member rotatably mounted to the stage and the engagement release device releases the holder engagement device from the stage engagement device by rotating the rocker member.

10. The image scanning device of claim 9, further comprising a stage drive that moves the stage, wherein the engagement release device includes a stop fixed relative to the stage, and the rocker member rotates when the stop contacts the rocker member as the stage moves relative to the stop.

11. The image scanning device of claim 1, further comprising:

an engagement detection device detecting and outputting an engagement signal when the holder engagement device and the stage engagement device are engaged, and a stage drive for moving the stage, the stage drive moving the stage to a scanning position where the document can be scanned in response to the engagement signal.

12. The image scanning device of claim 11, further comprising:

a housing containing at least the illumination device, the photoelectric conversion device, the stage and the stage drive, the housing having an opening formed at one end, and a door mounted to the housing near the opening, the door moving between an open position and a closed position to open and close the opening in accordance with inserting the document holder into or removing the document holder from the housing, wherein the door closes when the stage drive moves the stage to the scanning position.

13. An image scanning device comprising:

a document holder holding a document to be scanned, the document holder having a plurality of legs;

an illumination device illuminating the document;

a photoelectric conversion device converting light from the document into an electronic signal; and a stage receiving, supporting and positioning the document holder, the stage having a force applying device and a pair of rails, wherein when the document holder is mounted on the stage, the force applying device forces the legs of the document holder into contact with corresponding rails on the stage.

14. The image scanning device of claim 13, wherein the force applying device applies force to the document holder in positions on the document holder where the plurality of legs are each located.

15. An image scanning device comprising:
a document holder holding a document to be scanned;
an illumination device illuminating the document;
a photoelectric conversion device converting light from the document into an electronic signal;
a stage receiving, supporting and positioning the document holder;
a stage drive for moving the stage; and
a fixing device that fixes the stage at a fixing position outside a range where the document can be scanned.

16. The image scanning device of claim 15, further comprising a surface for supporting the stage, and
an interface fixed to the surface, the interface communicating with an image processor,
wherein the fixing device is mounted to the surface.

17. The image scanning device of claim 15, further comprising a fixing position signal output device that selectively outputs a fixing position signal, wherein the stage drive moves the stage to the fixing position in response to the fixing position signal.

18. An image scanning device comprising:
a document holder holding a document to be scanned;
an illumination device illuminating the document;
a photoelectric conversion device converting light from the document into an electronic signal;
a stage receiving, supporting and positioning the document holder;
a stage drive for moving the stage;
a housing containing at least the illumination device, the photoelectric conversion device, the stage and the stage drive, the housing having an opening formed at one end; and
a signal output device outputting an ejection signal in response to user operation,
wherein the stage drive moves the stage toward the opening in response to the ejection signal, and
wherein the signal output device selectively outputs one ejection signal in accordance with a first operation of the signal output device and the signal output device outputs a fixing position signal in accordance with a second operation of the signal output device, and wherein the stage drive moves the stage to a fixing position outside of a range where the document can be scanned in response to the fixing position signal.

19. The image scanning device of claim 18, wherein the second operation of the signal output device is performed after the first operation and for at least a predetermined time interval.

20. An image scanning apparatus of claim 18, wherein said document holder includes a holder engaging component, and said stage includes a stage engaging component engaging said stage with said holder engaging component,
said holder engaging component is one of either an engaging hole or engaging shaft and said stage engaging component is the other one of the engaging hole or engaging shaft,
and further comprising a release device that releases the engagement of said holder engaging component and said stage engaging component based on the movement of said stage.

21. An image scanning device comprising:
a document holder holding a document to be scanned;
an illumination device illuminating the document;
a photoelectric conversion device converting light from the document into an electronic signal;
a stage receiving, supporting and positioning the document holder;
a housing containing at least the illumination device, the photoelectric conversion device, the stage and the stage drive, the housing having an opening formed at one end;
a door mounted to the housing near the opening, the door moving between an open position and a closed position to open and close the opening in accordance with inserting the document holder into or removing the document holder from the housing; and
a fixing member attached to said housing at an end of the housing opposite said one end to fix said stage to said housing.

22. The image scanning device of claim 21, wherein the door is rotatably mounted to the housing on a shaft.

23. An image scanning device comprising:
document holding means for holding a document to be scanned;
illumination means for illuminating the document;
photoelectric conversion means for converting light from the document into an electronic signal;
stage means for receiving, supporting and positioning the document holding means; and
engagement means for engaging the document holding means with the stage means to position the document holding means relative to the stage means in a mounting direction, such that one of the engagement means and the stage means defines at least one hole and the other of the engagement means and the stage means is at least one shaft corresponding to and insertable into the at least one hole.

24. The image scanning device of claim 23, wherein the stage means further comprises return means that contacts the document holding means when the document holding means is mounted to the stage means and exerts an ejection force on the document holding means in an ejection direction opposite to the mounting direction, and
wherein the engagement means resists the ejection force of the return means to position the document holding means relative to the stage means in the mounting direction.

25. The image scanning device of claim 24, further comprising engagement release means wherein when the engagement release means releases the engagement means, the return means moves the document holding means in the ejection direction relative to the stage means.

26. The image scanning device of claim 24, wherein:
the document holding means includes a plurality of spacing means, and
the stage means includes force applying means and support means,
wherein when the document holding means is mounted on the stage means, the force applying means forces the spacing means of the document holding means into contact with a corresponding support means on the stage means.

27. The image scanning device of claim 23, wherein the engagement means comprises at least one hole formed in the document holding means and at least one shaft on the stage means, the at least one shaft corresponding to the at least one hole and inserting into the corresponding at least one hole.

28. The image scanning device of claim 23, wherein the engagement means comprises at least one shaft formed in the document holder and at least one hole formed in the stage means, the at least one shaft corresponding to the at least one hole and inserting into the corresponding at least one hole.

29. The image scanning device of claim 23, wherein the document holding means is positioned on the stage means in a lateral direction perpendicular to the mounting direction by positioning means on the stage means contacting the document holding means.

30. The image scanning device of claim 23, further comprising engagement release means that releases the engagement means.

31. The image scanning device of claim 30, wherein the engagement means comprises a rocker means mounted to the stage, the engagement release means releasing the engagement means by rotating the rocker means.

32. The image scanning device of claim 31, further comprising stage drive means for moving the stage means, wherein the engagement release means includes a stop fixed relative to the stage means, and the rocker means rotates when the stop contacts the rocker means as the stage means moves relative to the stop.

33. The image scanning device of claim 23, further comprising:
engagement detection means for detecting and outputting an engagement signal when the engagement means engages the document holding means with the stage means; and
stage drive means for moving the stage means, the stage drive means moving the stage means to a scanning position where the document can be scanned in response to the engagement signal.

34. The image scanning device of claim 33, further comprising:
housing means containing at least the illumination means, the photoelectric conversion means, the stage means and the stage drive means, the housing means having an opening formed at one end, and
door means mounted to the housing means near the opening, the door means opening to allow insertion of the document holding means into or removing the document holding means from the housing means,
wherein the door means closes when the stage drive means moves the stage means to the scanning position.

35. An image scanning device comprising:
document holding means for holding a document to be scanned, the document holding means having spacing means,
illumination means for illuminating the document;
photoelectric conversion means for converting light from the document into an electronic signal; and
stage means for receiving, supporting and positioning the document holder, the stage means having force applying means and support means;
wherein when the document holding means is mounted on the stage means, the force applying means forces the spacing means into contact with the support means.

36. The image scanning device of claim 35, wherein the force applying means applies force to the document holding means in positions where the spacing means are located.

37. An image scanning device comprising:
document holding means for holding a document to be scanned;
illumination means for illuminating the document;
photoelectric conversion means for converting light from the document into an electronic signal;
stage means for receiving, supporting and positioning the document holder;
stage drive means for moving the stage; and
fixing means for fixing the stage means at a fixing position outside a range where the document can be scanned.

38. The image scanning device of claim 37, further comprising:
a surface for supporting the stage means, and
interface means fixed to the surface, the interface means communicating with an image processing means,
wherein the fixing means is mounted to the surface.

39. The image scanning device of claim 37, further comprising fixing position signal output means for selectively outputting a fixing position signal, wherein the stage drive means moves the stage means to the fixing position in response to the fixing position signal.

40. An image scanning device comprising:
document holding means for holding a document to be scanned;
illumination means for illuminating the document;
photoelectric conversion means for converting light from the document into an electronic signal;
stage means for receiving, supporting and positioning the document holding means;
stage drive means for moving the stage means;
housing means containing at least the illumination means, the photoelectric conversion means, the stage means and the stage drive means, the housing means having an opening formed at one end; and
signal output means outputting an ejection signal in response to user operation,
wherein the stage drive means moves the stage means toward the opening in response to the ejection signal
wherein the signal output means selectively outputs one ejection signal in accordance with a first operation of the signal output means and the signal output means outputs a fixing position signal in accordance with a second operation of the signal output means, and wherein the stage drive means moves the stage means to a fixing position outside of a range where the document can be scanned in response to the fixing position signal.

41. The image scanning device of claim 40, wherein the second operation of the signal output means is performed after the first operation and for at least a predetermined time interval.

42. An image scanning apparatus of claim 40, wherein said document holding means includes a holder engaging component, and said stage means includes a stage engaging component engaging said stage means with said holder engaging component,
said holder engaging component is one of either an engaging hole or engaging shaft and said stage engaging component is the other one of the engaging hole or engaging shaft,
and further comprising a release means for releasing the engagement of said holder engaging component and said stage engaging component based on the movement of said stage means.

43. An image scanning device comprising:

document holding means for holding a document to be scanned;

illumination means for illuminating the document;

photoelectric conversion means for converting light from the document into an electronic signal;

stage means for receiving, supporting and positioning the document holder;

housing means containing the illumination means, the photoelectric conversion means, the stage means and the stage drive means, the housing means having an opening formed at one end;

door means mounted to the housing near the opening, the door means opening to allow insertion of the document holding means into and removal of the document holding means from the housing means, and fixing means for fixing attached to said housing means at an end of the housing means opposite said one end, said fixing means for fixing said stage means to said housing means.

44. The image scanning device of claim 43, wherein the door means is rotatably mounted to the housing means on a shaft.

* * * * *